United States Patent [19]

Vajtay

[11] 3,971,160

[45] July 27, 1976

[54] ENVIRONMENTAL PACKAGE

[76] Inventor: Leslie Vajtay, 215 Davidson Ave., Somerset, N.J. 08873

[22] Filed: Nov. 18, 1974

[21] Appl. No.: 524,563

[52] U.S. Cl................................ 47/34.11; 47/34.13; 47/37; 206/423
[51] Int. Cl.² ........................................ A01G 9/10
[58] Field of Search ................ 47/34, 13, 11, 5, 6, 47/37, 34.11, 34.13; 206/423, 45.33, 77, 203, 45.19, 45.21–45.23, 44, 154, 62–77, 527; 220/DIG. 13, DIG. 14, DIG. 12, 337, 338–342; 217/8, 10, 13, 43 R, 46, 57, 58, 59; 229/16 A, 16 D, 33, 35, 27, 28 R, 29 R, 6 A–15, 41 R, 44 R, 87 P, 92.3, 92.7, 16 D, 32, 34 R, 34 A, 34 B, 36

[56] References Cited
UNITED STATES PATENTS

| | | | |
|---|---|---|---|
| 1,862,863 | 9/1930 | Schnering | 206/45.19 |
| 2,456,610 | 12/1948 | Baker | 206/45.33 X |
| 2,774,187 | 12/1956 | Smithers | 47/34.11 X |
| 2,830,405 | 4/1958 | Nydegger | 47/34.11 |
| 3,254,758 | 6/1966 | Guyer | 206/45.33 |
| 3,375,607 | 4/1968 | Melvold | 47/34.13 |
| 3,524,279 | 8/1970 | Adams | 47/34.13 |
| 3,660,934 | 5/1972 | Pollack | 47/34.11 |
| 3,707,806 | 1/1973 | Toews | 47/34.13 |
| 3,734,749 | 5/1973 | Bridgford | 229/33 X |

Primary Examiner—Edgar S. Burr
Assistant Examiner—James R. Feyrer
Attorney, Agent, or Firm—Theodore E. Galanthay

[57] ABSTRACT

Disclosed is a package for shipping organic pellets for subsequent plant growth, the package being compactly collapsed during shipment and being openable into an enlarged chamber conducive to plant growth and having a pair of upwardly extending walls for supporting a transparent bag completing the enclosure of the enlarged chamber.

4 Claims, 3 Drawing Figures

ENVIRONMENTAL PACKAGE

BACKGROUND OF THE INVENTION

1. Field of the Invention

This invention relates to an environmental package and more particularly to a package for compactly transporting organic pellets and subsequently using the same package as an enlarged chamber conducive to plant growth.

2. Description of the Prior Art

It is well known to fabricate packaging that is compactly transportable and subsequently expandable. One technique relates to the separate fabrication of the top and bottom halves of a package, the sidewalls having a trapezoidal cross-section permitting stacking one half inside the other. Subsequently, the top half is placed over the bottom half upside down forming an enlarged chamber. In order for the enlarged chamber to be conducive to plant growth, such a package must be fabricated from a rigid clear plastic material which is prohibitively expensive for packaging relatively inexpensive items.

SUMMARY OF THE INVENTION

Accordingly, it is a primary object of this invention to inexpensively and compactly package organic matter, the package also forming an enlarged chamber conducive to plant growth.

It is another object of this invention to provide an improved package fabricatable from a large variety of inexpensive materials.

It is still a further object of this invention to form an improved package that is readily transformable from a compact to an enlarged size.

In accordance with the present invention there is provided a rigid plastic support base including a plurality of compartments adapted to retain water. A pair of movable end panels are attached to the support base forming an intermediate structure having a pair of upwardly extending walls. The intermediate structure is inserted into a transparent plastic bag which is supported by the upwardly extending walls completing the enclosure of the enlarged chamber conducive to plant growth.

The above mentioned objects, features, and advantages of the invention, together with others inherent in the same, are attained by the embodiments illustrated in the drawings, the same being merely preferred exemplary forms, and are described more particularly as follows:

IN THE DRAWINGS

DESCRIPTION

Figure 1:
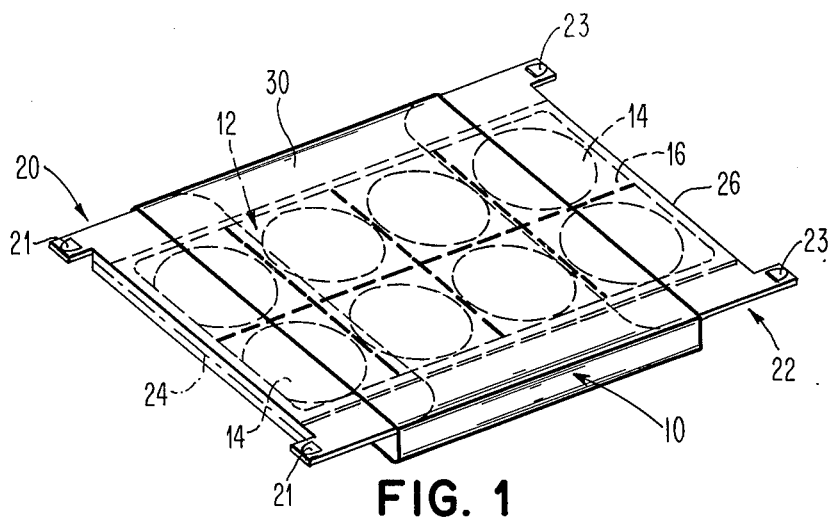
FIG. 1 is a perspective view illustrating the package closed for transportation.

Refer now to FIG. 1 which illustrates the present invention when compactly collapsed for transportation. Support base 10 is conveniently formed from any thermo formable rigid plastic material as little as 10 mils in thickness. Support base 10 includes a plurality of compartments 12 which are adapted to subsequently retain water. Each of the compartments 12 usually includes the organic matter to be transported such as organic pellet 14. Also note flange 16 around the periphery of support base 10 adding strength and rigidity to the package. The pair of end panels 20 and 22 are shown folded down over the support base and a sleeve 30 is shown encircling this compact package. Sleeve 30 could typically be made from paper and carry the desired trademark and other identifying as well as advertising information. Also included in the package but not shown in FIG. 1 is a transparent plastic bag. With respect to end panel 20 note tabs 21 formed with locking arrowheads as are tabs 23 with respect to end panel 22. Also illustrated in FIG. 1 are fold lines 24 and 26 the function of which will be more readily apparent with reference to FIG. 2.

Figure 2:
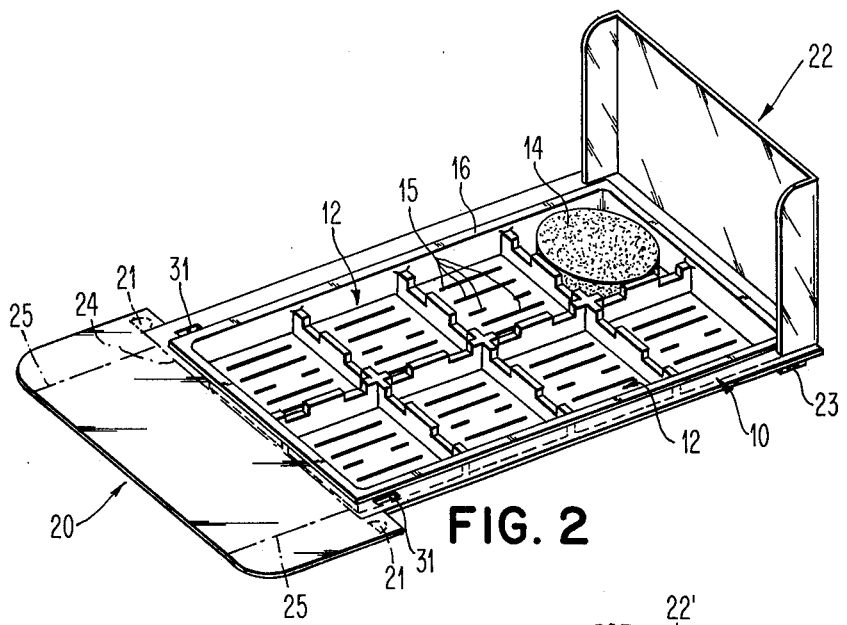
FIG. 2 is a perspective view illustrating the package with one end panel in place, the other end panel laying flat to illustrate the fold lines.

Refer now to FIG. 2 in which corresponding items have been numbered with corresponding reference numerals in so far as practical. Note that sleeve 30 has been removed and end panel 22 has been folded up in its rigidified upwardly extending final position. Also, end panel 20 has been layed flat to illustrate the various fold lines required in accordance with one aspect of the present invention. End panels 20 and 22 can be formed with ribs for added strength. One of the water retaining compartments 12 has been shown with an organic pellet 14 therein. Also illustrated are raised ribs 15 within each of the water compartments 12 permitting drainage and water circulation underneath each of the pellets 14. The separaters between the compartments 12 permit water to circulate among the various compartments before it would spill out of any of them. It is noted that during transportation, pellets 14 are completely dry and it is only at a subsequent time, when plants are actually grown, that water is added.

With continued reference to FIG. 2 note that in the final assembly of the present package, end panels such as 20 are folded along fold lines 24 and 25 and the locking tabs are inserted in slots 31. This rigidifies the end panels into a pair of upwardly extending walls. A transparent plastic bag (not shown in FIG. 2 for purposes of simplifying the illustration) is then pulled over the illustrated intermediate structure. The transparent plastic bag may be a fraction of a mil in thickness and should be long enough to permit the end to be either tucked under support base 10 or otherwise closed. Organic pellets 14 can then be watered either by removing the intermediate structure from the bag or by punching holes into the top of the bag. The transparent bag is supported by the upwardly extending walls 20 and 22 and in any event is sufficiently light not to damage growing plants.

It is here noted that the present package is fabricatable from the cheapest possible materials. The entire intermediate structure of FIG. 2 can be made from opaque plastic material since the transparent bag provides adequate light. It is known that opaque plastics (and even other materials such as cardboard) are far less expensive than attempting to fabricate the intermediate structure of FIG. 2 entirely of transparent plastic materials. It is further noted that the arrangement of FIG. 2 is a rigidifying technique such that relatively thin plastic material in the order of 10 mils in thicknes may be used. Thermo-formable rigid plastic materials are the preferred material that is inexpensive and adapted to retain water. DUring transportation, the package has a profile not much higher than the thickness of the pellets 14. In the open position, however, any desired height, much higher than the original height to accommodate relatively large plants is provided by the size of end panels 20 and 22. It is an important feature of this invention that the enlarged chamber is transparent to light, and yet shields plants from drafts, thereby providing an environment conducive to plant growth. A further feature is the simplicity and ease of assembly by the user.

Figure 3:
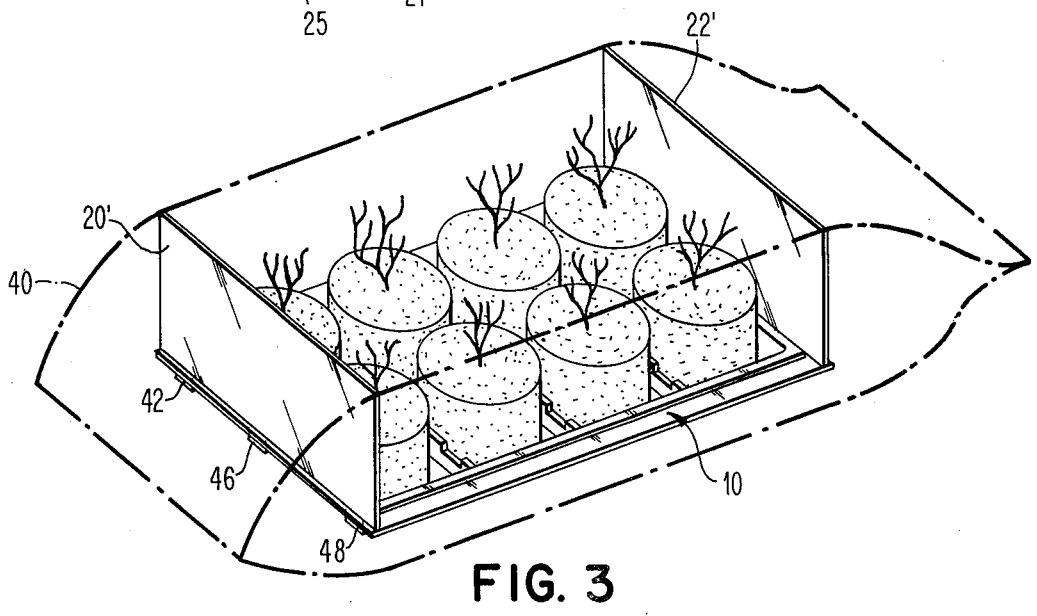
FIG. 3 is a perspective view of the enlarged chamber with an alternate technique of attaching the end panels.

Refer now to FIG. 3 where corresponding items have again been labeled with corresponding reference numerals in so far as practical. FIG. 3 illustrates that the entire intermediate structure might be fabricated from molded foam or similar sheet material and the end panels might have a plurality of tabs such as 42, 46, and 48 insertable into correspondingly located slots in the support base. Such end panels would similarly form a pair of upwardly extending walls to support a transparent bag 40. Note that bag 40 has been illustrated long enough to close, if desired, for the completed environmental package. Also, the organic pellets are shown after they have expanded from watering and plant growth has actually begun to take place.

What has then been described is an improved environmental package that is not only attractive and functional but relatively inexpensive. By the present invention, the cost of large rigid transparent plastic forms has been eliminated. Two basic embodiments have been illustrated, however, those skilled in the art will recognize that these as well as various other changes in structure and mode of operation may be made without departing from the spirit and scope of the invention.

What is claimed is:

1. An environmental package adapted for compact transportation of organic matter and for subsequent formation of an enlarged enclosed chamber with adequate room for plant growth, comprising:

a support base including a plurality of compartments adapted to retain liquid, each said compartment having upwardly extending sidewalls and a bottom surface;

a pair of end panels attached to said support base and in a first position folded flat over said support base in a plane substantially parallel with the bottom surface of each said compartment, and in a second position folded upright in a plane substantially perpendicular to the bottom surface of each said compartment;

each said end panel having end sections foldable in a plane perpendicular to both the remaining portion of said end panels and the bottom surface of each said compartment, each said end section having a depending locking means for engaging said support base;

each said end panel having, in said second position, a vertical dimension substantially greater than the vertical dimension of said organic matter, the vertical dimension of each said end panel being substantially equal to at least the greatest height of anticipated plant growth within a subsequently formed enlarged enclosed chamber, thereby forming an intermediate structure; and transparent bag means, said intermediate structure being inserted in said bag means which is supported by said pair of end panels, completing the enlarged enclosed chamber with adequate room for plant growth.

2. An environmental package as in claim 1, wherein each said compartment having upwardly extending sidewalls and a bottom surface, said bottom surface further including upwardly extending ribs for supporting said organic matter, said sidewalls between compartments having openings permitting the overflow of liquid from one compartment to another.

3. An environmental package as in claim 1 wherein said locking means is a tab.

4. An environmental package as in claim 3 wherein said tab has an arrowhead to perform the locking function.

* * * * *